United States Patent
Liang

(10) Patent No.: US 12,340,722 B2
(45) Date of Patent: Jun. 24, 2025

(54) PIXEL CIRCUIT AND DRIVING METHOD THEREOF, DISPLAY SUBSTRATE, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventor: Hengzhen Liang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/801,531

(22) PCT Filed: Nov. 10, 2021

(86) PCT No.: PCT/CN2021/129786
§ 371 (c)(1),
(2) Date: Aug. 23, 2022

(87) PCT Pub. No.: WO2022/227485
PCT Pub. Date: Nov. 3, 2022

(65) Prior Publication Data
US 2024/0221573 A1 Jul. 4, 2024

(30) Foreign Application Priority Data
Apr. 29, 2021 (CN) .................. 202110476792.X

(51) Int. Cl.
*G09G 3/3225* (2016.01)
*G09G 3/20* (2006.01)

(52) U.S. Cl.
CPC ......... *G09G 3/2007* (2013.01); *G09G 3/3225* (2013.01); *G09G 2300/0426* (2013.01);
(Continued)

(58) Field of Classification Search
CPC ............... H10K 59/128; H10K 59/121; H10K 2102/3031; G09G 2300/0804;
(Continued)

(56) References Cited

U.S. PATENT DOCUMENTS

| 2005/0258744 A1 | 11/2005 | Kwak et al. |
| 2010/0013816 A1 | 1/2010 | Kwak |

(Continued)

FOREIGN PATENT DOCUMENTS

| CN | 101976544 A | 2/2011 |
| CN | 103000132 A | 3/2013 |

(Continued)

OTHER PUBLICATIONS

International Search Report for PCT/CN2021/129786 Mailed Feb. 9, 2022.
(Continued)

*Primary Examiner* — Nitin Patel
*Assistant Examiner* — Amen W Bogale
(74) *Attorney, Agent, or Firm* — Ling Wu; Stephen Yang; Ling and Yang Intellectual Property

(57) ABSTRACT

A pixel circuit is provided and configured to drive a first light emitting unit and a second light emitting unit of a sub-pixel to emit light. The pixel circuit includes: an input circuit, a first light emitting control circuit, and a second light emitting control circuit. The input circuit is configured to write a data signal provided by a data signal line to a first node and store the data signal written into the first node, under controlling of a scanning signal provided by a scanning signal line. The first light emitting control circuit is configured to provide a driving current to a second node, under controlling of a first power supply signal provided by (Continued)

a first power supply line, the first node, and a light emitting control signal provided by a light emitting control signal line.

15 Claims, 11 Drawing Sheets

(52) U.S. Cl.
CPC ............... *G09G 2300/0452* (2013.01); *G09G 2300/0465* (2013.01); *G09G 2300/0842* (2013.01); *G09G 2300/0861* (2013.01); *G09G 2310/08* (2013.01); *G09G 2320/0233* (2013.01); *G09G 2330/021* (2013.01)

(58) Field of Classification Search
CPC ... G09G 2300/0426; G09G 2320/0686; G09G 2300/0452; G09G 2300/0465; G09G 2300/0842; G09G 2300/0861; G09G 2310/08; G09G 2320/0233; G09G 2330/021; G09G 3/2007; G09G 3/32; G09G 3/3225; G09G 3/3233; G09F 9/302; Y02B 20/30
See application file for complete search history.

(56) References Cited

U.S. PATENT DOCUMENTS

| | | |
|---|---|---|
| 2011/0025659 A1 | 2/2011 | Kwak et al. |
| 2014/0333686 A1 | 11/2014 | Kim et al. |
| 2017/0287988 A1 | 10/2017 | Lee et al. |
| 2018/0247988 A1 | 8/2018 | Lee et al. |
| 2018/0277037 A1 | 9/2018 | Lin et al. |
| 2019/0108790 A1* | 4/2019 | Liang ................. G09G 3/3241 |
| 2019/0385513 A1* | 12/2019 | Iguchi ................. G09G 3/006 |
| 2020/0058245 A1* | 2/2020 | Cui ..................... H10K 59/352 |
| 2020/0402463 A1 | 12/2020 | Wang |
| 2021/0280663 A1* | 9/2021 | Kim ..................... H10K 59/131 |
| 2021/0305336 A1* | 9/2021 | Tang ..................... H10K 59/17 |
| 2022/0293052 A1* | 9/2022 | Lee ..................... H10H 29/142 |
| 2022/0310008 A1 | 9/2022 | Jin |
| 2022/0310011 A1 | 9/2022 | Chen et al. |
| 2024/0194121 A1* | 6/2024 | Sun ..................... G09G 3/3233 |

FOREIGN PATENT DOCUMENTS

| | | |
|---|---|---|
| CN | 106782301 A | 5/2017 |
| CN | 107068063 A | 8/2017 |
| CN | 107256695 A | 10/2017 |
| CN | 107644948 A | 1/2018 |
| CN | 108364607 A | 8/2018 |
| CN | 109274792 A | 1/2019 |
| CN | 111312158 A | 6/2020 |
| CN | 111653242 A | 9/2020 |
| CN | 111696484 A | 9/2020 |
| CN | 111986621 A | 11/2020 |
| CN | 113223459 A | 8/2021 |

OTHER PUBLICATIONS

Office Action dated Jan. 12, 2022 for Chinese Patent Application No. 202110476792.X and English Translation.
Notice of Allowance dated Jun. 20, 2022 for Chinese Patent Application No. 202110476792.X and English Translation.

* cited by examiner

PIXEL CIRCUIT AND DRIVING METHOD THEREOF, DISPLAY SUBSTRATE, AND DISPLAY APPARATUS

CROSS-REFERENCE TO RELATED APPLICATION

The present application is a U.S. National Phase Entry of International Application No. PCT/CN2021/129786 having an international filing date of Nov. 10, 2021, which claims priority to Chinese Patent Application No. 202110476792.X, filed to the CNIPA on Apr. 29, 2021 and entitled "Pixel Circuit and Driving Method Thereof, Display Substrate, and Display Apparatus". The above-identified applications are hereby incorporated by reference.

TECHNICAL FIELD

The present document relates to, but is not limited to, the field of display technologies, in particular to a pixel circuit and a driving method thereof, a display substrate, and a display apparatus.

BACKGROUND

An Organic light emitting Diode (OLED) is an active display apparatus and has advantages such as self-luminescence, wide view, high contrast, low power consumption, extremely high response speed, etc. With the continuous development of display technology, a display apparatus using an OLED as a light emitting device and a Thin Film Transistor (TFT) for signal control has become a mainstream product in the field of display at present.

SUMMARY

The following is a summary of subject matters described herein in detail. The summary is not intended to limit the protection scope of claims.

Embodiments of the present disclosure provide a pixel circuit and a driving method thereof, a display substrate, and a display apparatus.

In one aspect, an embodiment of the present disclosure provides a pixel circuit, configured to drive a first light emitting unit and a second light emitting unit of a sub-pixel to emit light. The pixel circuit includes an input circuit, a first light emitting control circuit, and a second light emitting control circuit. The input circuit is coupled with a data signal line, a scanning signal line, a first node, and a first power supply line, respectively, and is configured to write a data signal provided by the data signal line to the first node and store the data signal written to the first node, under controlling of a scanning signal provided by the scanning signal line. The first light emitting control circuit is coupled with the first node, a second node, the first power supply line, and a light emitting control signal line, respectively, and is configured to provide a driving current to the second node under controlling of the first power supply signal provided by the first power supply line, the first node, and a light emitting control signal provided by the light emitting control signal line; the second node is coupled with a first electrode of the first light emitting unit. The second light emitting control circuit is respectively coupled with a control terminal, the second node, and a third node, and is configured to conduct the second node and the third node, under controlling of the control terminal; the third node is coupled with a first electrode of the second light emitting unit. A second electrode of the first light emitting element and a second electrode of the second light emitting element are both coupled with a second power supply line.

In some exemplary embodiments, the control terminal is coupled with the first node.

In some exemplary embodiments, the input circuit includes a data writing transistor and a storage capacitor. A control electrode of the data writing transistor is coupled with the scanning signal line, a first electrode of the data writing transistor is coupled with the data signal line, and a second electrode of the data writing transistor is coupled with the first node; a first terminal of the storage capacitor is coupled with the first power supply line, and a second terminal of the storage capacitor is coupled with the first node.

In some exemplary embodiments, the first light emitting control circuit includes a driving transistor and a first light emitting control transistor. A control electrode of the driving transistor is coupled with the first node, a first electrode of the driving transistor is coupled with the first power supply line, and a second electrode of the driving transistor is coupled with a first electrode of the first light emitting control transistor. A control electrode of the first light emitting control transistor is coupled with the light emitting control signal line, and a second electrode of the first light emitting control transistor is coupled with the second node.

In some exemplary embodiments, the second light emitting control circuit includes a second light emitting control transistor. A control electrode of the second light emitting control transistor is coupled with the control terminal, a first electrode of the second light emitting control transistor is coupled with the second node, and a second electrode of the second light emitting control transistor is coupled with the third node.

In some exemplary embodiments, the input circuit includes a data writing transistor and a storage capacitor; the first light emitting control circuit includes a driving transistor and a first light emitting control transistor; the second light emitting control circuit includes a second light emitting control transistor. A control electrode of the data writing transistor is coupled with the scanning signal line, a first electrode of the data writing transistor is coupled with the data signal line, and a second electrode of the data writing transistor is coupled with the first node. A first terminal of the storage capacitor is coupled with the first power supply line, and a second terminal of the storage capacitor is coupled with the first node. A control electrode of the driving transistor is coupled with the first node, a first electrode of the driving transistor is coupled with the first power supply line, and a second electrode of the driving transistor is coupled with the first electrode of the first light emitting control transistor. The control electrode of the first light emitting control transistor is coupled with the light emitting control signal line, and the second electrode of the first light emitting control transistor is coupled with the second node. The control electrode of the second light emitting control transistor is coupled with the first node, the first electrode of the second light emitting control transistor is coupled with the second node, and the second electrode of the second light emitting control transistor is coupled with the third node.

In another aspect, an embodiment of the present disclosure provides a driving method for a pixel circuit, which is used for driving the above pixel circuit. The driving method includes: when displaying a gray-scale of a first range, writing, by an input circuit, a data signal provided by a data signal line to a first node and storing the data signal written to the first node, under controlling of a scanning signal provided by a scanning signal line; providing, by a first light emitting control circuit, a driving current to a second node, under controlling of a first power supply signal provided by a first power supply line, the first node, and a light emitting control signal provided by a light emitting control signal line, and providing, by a second light emitting control circuit, a driving current to a third node, under controlling of a control terminal. When a gray-scale of a second range is displayed, the input circuit writes a data signal provided by the data signal line to the first node and stores the data signal written to the first node, under controlling of a scanning signal provided by the scanning signal line; the first light emitting control circuit provides a driving current to the second node, under controlling of a first power supply signal provided by the first power supply line, the first node, and a light emitting control signal provided by the light emitting control signal line, and the second light emitting control circuit disconnects the second node and the third node, under controlling of the control terminal. Herein, gray-scales of the first range are larger than gray-scales of the second range.

In another aspect, an embodiment of the present disclosure provides a display substrate, including a plurality of sub-pixels disposed on a substrate. At least one sub-pixel includes a pixel circuit as described above, and a first light emitting unit and a second light emitting unit coupled with the pixel circuit.

In some exemplary embodiments, the first light emitting unit includes a first anode, a first cathode, and a first organic light emitting layer disposed between the first anode and the first cathode. The light emitting unit includes a second anode, a second cathode, and a second organic light emitting layer disposed between the second anode and the second cathode. The first anode and the second anode are isolated from each other, the first anode and the second anode are coupled with the pixel circuit; the first organic light emitting layer and the second organic light emitting layer are isolated from each other, and the first cathode and the second cathode are of an integrated structure.

In some exemplary embodiments, the first light emitting unit is located on a side of the second light emitting unit.

In some exemplary embodiments, the first light emitting unit surrounds a periphery of the second light emitting unit.

In some exemplary embodiments, the first light emitting unit includes a first light emitting portion and a second light emitting portion, and the second light emitting unit is located between the first light emitting portion and the second light emitting portion.

In some exemplary embodiments, the at least one sub-pixel at least includes a green sub-pixel.

In another aspect, a display apparatus is provided in an embodiment of the present disclosure, which includes the aforementioned display substrate.

Other aspects may be understood upon reading and understanding the drawings and the detailed description.

BRIEF DESCRIPTION OF DRAWINGS

Accompanying drawings are used for providing further understanding for technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of one or more components in the drawings do not reflect true scales, and are only intended to schematically describe contents of the present disclosure.

DETAILED DESCRIPTION

Figure 1:
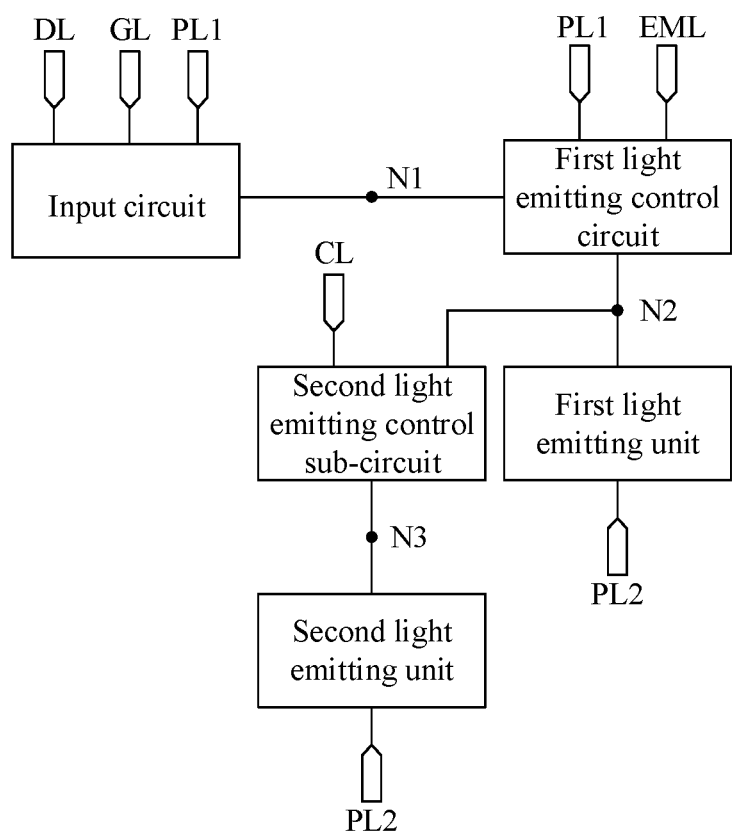
FIG. 1 is a schematic diagram of a structure of a pixel circuit according to at least one embodiment of the present disclosure.

The embodiments of the present disclosure will be described below in combination with the drawings in detail. Implementation modes may be implemented in a plurality of different forms. Those of ordinary skills in the art can readily understand a fact that modes and contents may be transformed into a plurality of forms without departing from the purpose and the scope of the present disclosure. Therefore, the present disclosure should not be explained as being limited to contents described in following implementation modes only. The embodiments in the present disclosure and features in the embodiments may be combined randomly with each other if there is no conflict.

In the drawings, a size of one or more constituent elements, a thickness of a layer, or a region is sometimes exaggerated for clarity. Therefore, a mode of the present disclosure is not necessarily limited to the size, and a shape and a size of one or more components in the drawings do not reflect a true proportion. In addition, the drawings schematically illustrate ideal examples, and one embodiment of the present disclosure is not limited to the shapes, numerical values, or the like shown in the drawings.

Ordinal numerals such as "first", "second", and "third" in the specification are set to avoid confusion of constituent elements, but not to set a limit in quantity. In the present disclosure, "a plurality of" represents two or more than two.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate based on the directions according to which the constituent elements are described. Therefore, appropriate replacements can be made according to situations without being limited to the wordings described in the specification.

In the specification, unless otherwise specified and defined explicitly, terms "mount", "mutually connect", and "connect" should be understood in a broad sense. For example, it may be a fixed connection, a detachable connection, or an integrated connection; it may be a mechanical connection or a connection; it may be a direct connection, an indirect connection through an intermediate component, or communication inside two components. Those of ordinary skills in the art may understand meanings of the above-mentioned terms in the present disclosure according to situations.

In the specification, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region and the source electrode. In the present disclosure, the channel region refers to a region which the current flows mainly through. In the specification, the channel region refers to a region through which a current mainly flows.

In this specification, a control electrode may be a gate electrode. A first electrode may be a drain electrode and a second electrode may be a source electrode, or the first electrode may be a source electrode and the second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchanged in the specification.

In this specification, a "connection" or "coupling" includes a case in which constitute essential factors are connected together through an element having a certain electrical effect. The "element having a certain electrical function" is not particularly limited as long as electrical signals between the connected constituent elements may be transmitted. Examples of "the element with a certain electric effect" not only include an electrode and wire, but also a switch element (such as a transistor, etc.), a resistor, an inductor, a capacitor, other elements, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the present disclosure, "about" refers to that a boundary is defined not so strictly and numerical values within process and measurement error ranges are allowed.

An OLED light emitting device includes a first electrode, a second electrode, and an organic light emitting layer disposed between the first electrode and the second electrode. The organic light emitting layer is driven by the first electrode and the second electrode to emit light of a corresponding color. Uniformity of an organic light emitting layer of a light emitting device of a display substrate and a film layer of a Thin Film Transistor (TFT) of a pixel circuit will affect uniformity of display. In high gray-scale display, it is difficult for human eyes to find a display difference because of a high brightness of the light emitting device. However, in low gray-scale display, a driving current is relatively small, and a difference between film thicknesses of the TFT and the organic light emitting layer will obviously affect a display effect, resulting in uneven display that can be observed by human eyes, which makes a picture have granular sensation, that is, low gray-scale uneven (mura) display.

At least one embodiment of the present disclosure provides a pixel circuit and a driving method thereof, a display substrate, and a display apparatus. By performing partition display control on sub-pixels, the display effect is improved.

FIG. 1 is a schematic diagram of a structure of a pixel circuit according to at least one embodiment of the present disclosure. As shown in FIG. 1, the pixel circuit according to the exemplary embodiment is configured to drive a first light emitting unit and a second light emitting unit of a sub-pixel to emit light. In the present example, a brightness of the sub-pixel is a result of displaying jointly of the first light emitting unit and the second light emitting unit. A luminous region of the sub-pixel is divided into two parts: the first light emitting unit and the second light emitting unit. A luminous area of the sub-pixel is a sum of a luminous area of the first light emitting unit and a luminous area of the second light emitting unit. For example, a luminous area corresponds to an area of an opening of a pixel definition layer.

In the present exemplary embodiment, as shown in FIG. 1, the pixel circuit includes an input circuit, a first light emitting control circuit, and a second light emitting control circuit. The input circuit is coupled with a data signal line DL, a scanning signal line GL, a first power supply line PL1, and a first node N1, respectively, and is configured to write a data signal provided by the data signal line DL to the first node N1 and store the data signal written to the first node N1, under controlling of a scanning signal provided by the scanning signal line GL. The first light emitting control circuit is coupled with the first node N1, the second node N2, the first power supply line PL1 and the light emitting control signal line EML, respectively, and is configured to provide a driving current to the second node N2, under controlling of a first power supply signal provided by the first power supply line PL1, the first node N1, and a light emitting control signal provided by the light emitting control signal line EML. The second node N2 is coupled with a first electrode of the first light emitting unit. The second light emitting control circuit is coupled with a control terminal CL, the second node N2, and a third node N3, respectively, and is configured to conduct the second node N2 and the third node N3, under controlling of the control terminal CL. The third node N3 is coupled with a first electrode of the second light emitting unit. A second electrode of the first light emitting unit and a second electrode of the second light emitting unit are both coupled with a second power supply line PL2.

In the present exemplary embodiment, as shown in FIG. 1, the first Node N1 is coupled with an output terminal of the input circuit and one input terminal of the first light emitting control circuit, the second Node N2 is coupled with an output terminal of the first light emitting control circuit and the first electrode of the first light emitting unit, and the third Node N3 is coupled with an output terminal of the second light emitting control circuit and the first electrode of the second light emitting unit. The first node N1 is equipotential with the output terminal of the input circuit and one input terminal of the first light emitting control circuit, the second node N2 is equipotential with the output terminal of the first light emitting control circuit and the first electrode of the first light emitting unit, and the third node N3 is equipotential with the output terminal of the second light emitting control circuit and the first electrode of the second light emitting unit. In some examples, the first node N1, the second node N2, and the second node N3 do not represent components which are actually present, but rather represent a meeting point of relevant circuit connections in a circuit diagram.

In some exemplary embodiments, a first light emitting unit and a second light emitting unit included in one sub-pixel may both be Organic Light Emitting Diodes (OLEDs). A first electrode of the first light emitting unit and a first electrode of the second light emitting unit may be anodes, and a second electrode of the first light emitting unit and a second electrode of the second light emitting unit may be cathodes. The anode of the first light emitting unit is coupled with the second node N2, and the cathode of the first light emitting unit is coupled with the second power supply line PL2; the anode of the second light emitting unit is coupled with the third node N3, and the cathode of the second light emitting unit is coupled with the second power supply line PL2. The cathode of the first light emitting unit and the cathode of the second light emitting unit may be of an integrated structure. However, this embodiment is not limited thereto. In some examples, the first light emitting unit and the second light emitting unit included in the sub-pixel may be a Quantum Dot Light Emitting Diode (QLED), a Micro Light Emitting Diode (Micro-LED), or a Mini-LED.

In some exemplary embodiments, the first power supply line PL1 may continuously provide a high level signal, for example, the first power supply line PL1 provides a first power supply signal VDD; and the second power supply line PL2 may continuously provide a low level signal, for example, the second power supply line PL2 provides a second power signal VSS. However, this embodiment is not limited thereto.

In the pixel circuit provided in the present embodiment, the first light emitting unit of the sub-pixel is controlled to emit light by the first light emitting control circuit, and the second light emitting unit of the sub-pixel is controlled to emit light by the first light emitting control circuit and the second light emitting control circuit. The pixel circuit of the present embodiment may respectively drive the first light emitting unit and the second light emitting unit of the sub-pixel to emit light through different voltages, so as to achieve partition driving for the sub-pixel. Under driving of different voltages, luminous areas of the sub-pixel are different. In this way, a luminous area of the sub-pixel may be reduced in low gray-scale display, thereby achieving improvement of a driving current, so as to improve the display effect under the low gray-scale.

Figure 2:
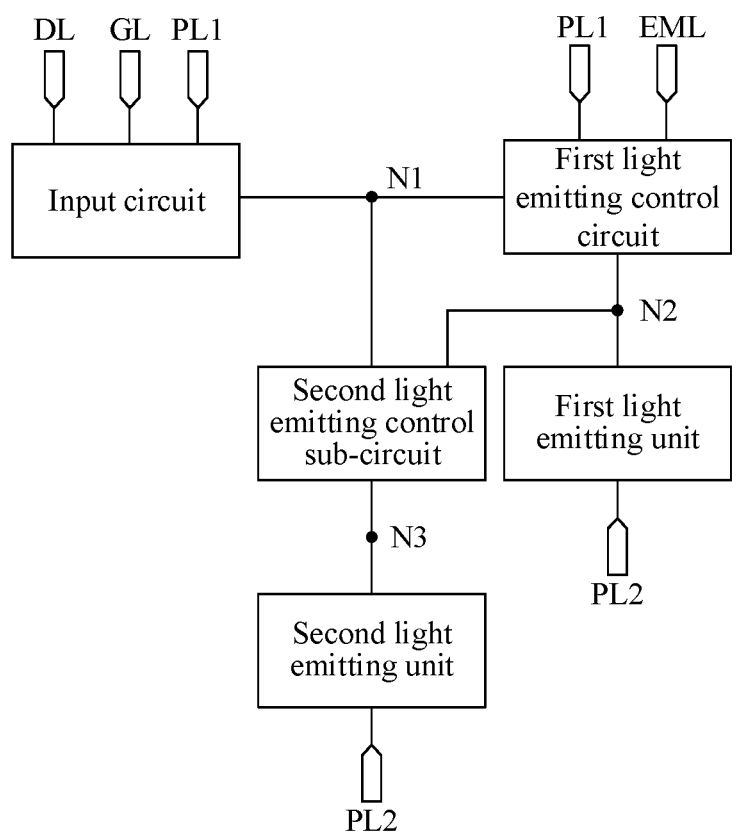
FIG. 2 is a schematic diagram of another structure of a pixel circuit according to at least one embodiment of the present disclosure.

FIG. 2 is a schematic diagram of another structure of a pixel circuit according to at least one embodiment of the present disclosure. As shown in FIG. 2, the pixel circuit includes an input circuit, a first light emitting control circuit, and a second light emitting control circuit. Herein, a control terminal CL is coupled with a first node N1. In the present example, the second light emitting control circuit is coupled with the first node N1, a second node N2, and a third node N3, respectively, and is configured to conduct the second node N2 and the third node N3, under control of the first node N1. In the present embodiment, by coupling the control terminal CL with the first node N1, there is no need for a gate driving circuit to provide a signal to the control terminal CL, which may simplify a structure of the gate driving circuit, save wiring, and being beneficial to a narrow bezel design of a display apparatus.

Rest of the structure of the pixel circuit of the present embodiment may refer to a description of the pixel circuit described in FIG. 1, and thus will not be repeated here.

Figure 3:
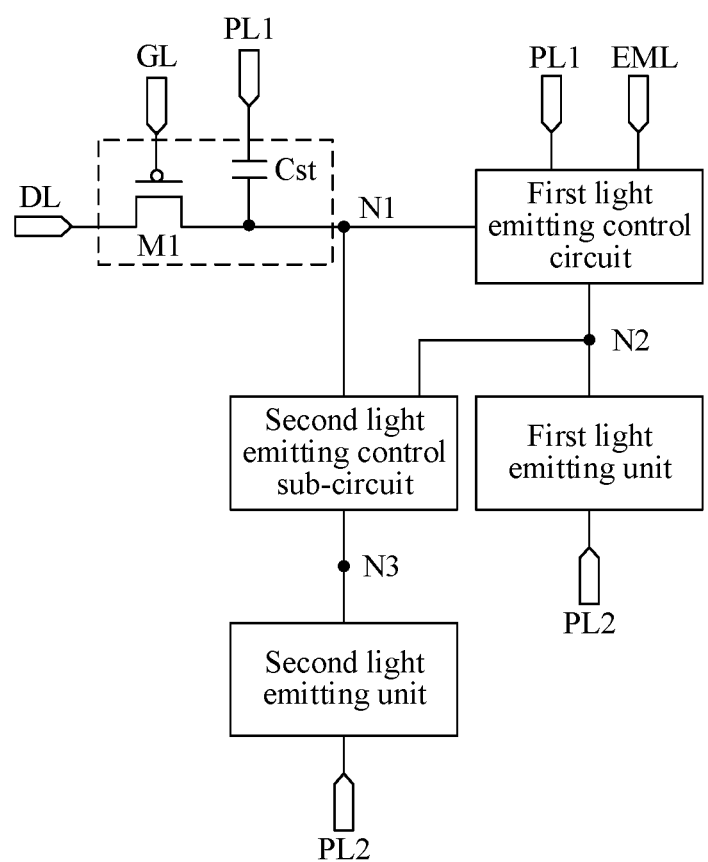
FIG. 3 is an equivalent circuit diagram of an input circuit of a pixel circuit according to at least one embodiment of the present disclosure.

FIG. 3 is an equivalent circuit diagram of an input circuit of a pixel circuit according to at least one embodiment of the present disclosure. As shown in FIG. 3, an input circuit in the pixel circuit according to the present exemplary embodiment includes a data writing transistor M1 and a storage capacitor Cst. A control electrode of the data writing transistor M1 is coupled with a scanning signal line GL, a first electrode of the data writing transistor M1 is coupled with a data signal line DL, and a second electrode of the data writing transistor M1 is coupled with a first node N1. A first terminal of the storage capacitor Cst is coupled with a first power supply line PL1, and a second terminal of the storage capacitor Cst is coupled with the first node N1.

FIG. 3 illustrates an exemplary structure of the input circuit. Those skilled in the art easily understand that implementations of the input circuit are not limited to this, as long as its functions can be achieved.

Figure 4:
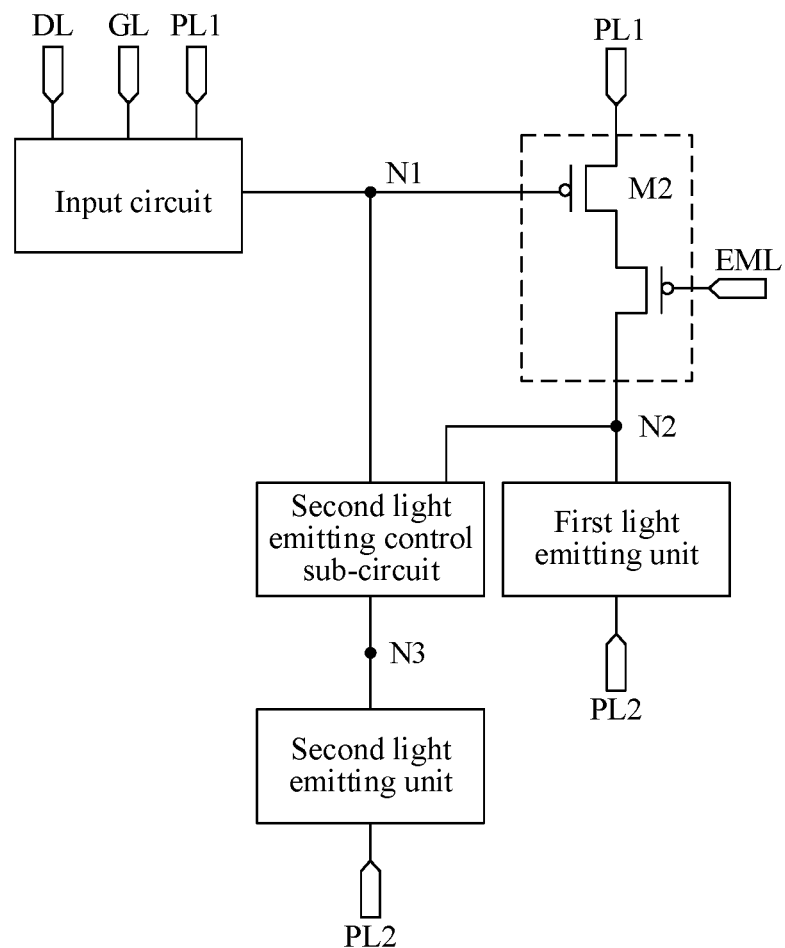
FIG. 4 is an equivalent circuit diagram of a first light emitting control circuit of a pixel circuit according to at least one embodiment of the present disclosure.

FIG. 4 is an equivalent circuit diagram of a first light emitting control circuit of a pixel circuit according to at least one embodiment of the present disclosure. As shown in FIG. 4, the first light emitting control circuit in the pixel circuit according to an exemplary embodiment includes: a driving transistor M2 and a first light emitting control transistor M3. A control electrode of the driving transistor M2 is coupled with a first node N1, a first electrode of the driving transistor M2 is coupled with a first power supply line PL1, and a second electrode of the driving transistor M2 is coupled with a first electrode of the first light emitting control transistor M3. A control electrode of the first light emitting control transistor M3 is coupled with a light emitting control signal line EML, and a second electrode of the first light emitting control transistor M3 is coupled with a second node N2. The second node N2 is coupled with a first electrode of a first light emitting unit.

FIG. 4 illustrates an exemplary structure of the first light emitting control circuit. Those skilled in the art easily understand that implementations of the first light emitting control circuit are not limited to this, as long as its functions can be achieved.

Figure 5:
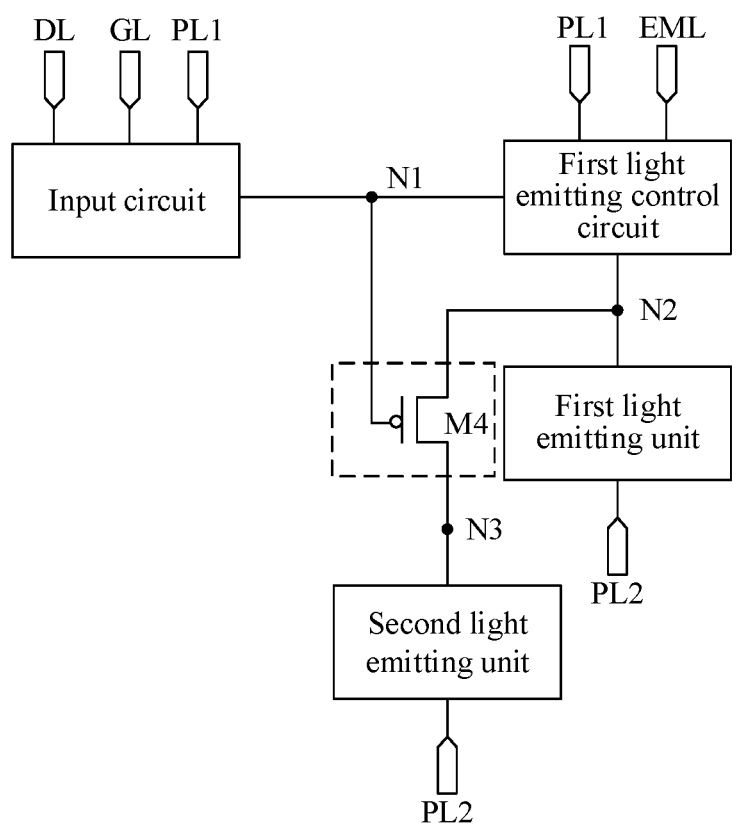
FIG. 5 is an equivalent circuit diagram of a second light emitting control circuit of a pixel circuit according to at least one embodiment of the present disclosure.

FIG. 5 is an equivalent circuit diagram of a second light emitting control circuit of a pixel circuit according to at least one embodiment of the present disclosure. As shown in FIG. 5, the second light emitting control circuit in the pixel circuit according to the present exemplary embodiment includes: a second light emitting control transistor M4. A control electrode of the second light emitting control transistor M4 is coupled with a first node N1, a first electrode of the second light emitting control transistor M4 is coupled with a second node N2, and a second electrode of the second light emitting control transistor M4 is coupled with a third node N3. The third node N3 is coupled with a first electrode of a second light emitting unit.

FIG. 5 illustrates an exemplary structure of the second light emitting control circuit. Those skilled in the art easily understand that implementations of the second light emitting control circuit are not limited to this, as long as its functions can be achieved.

Figure 6:
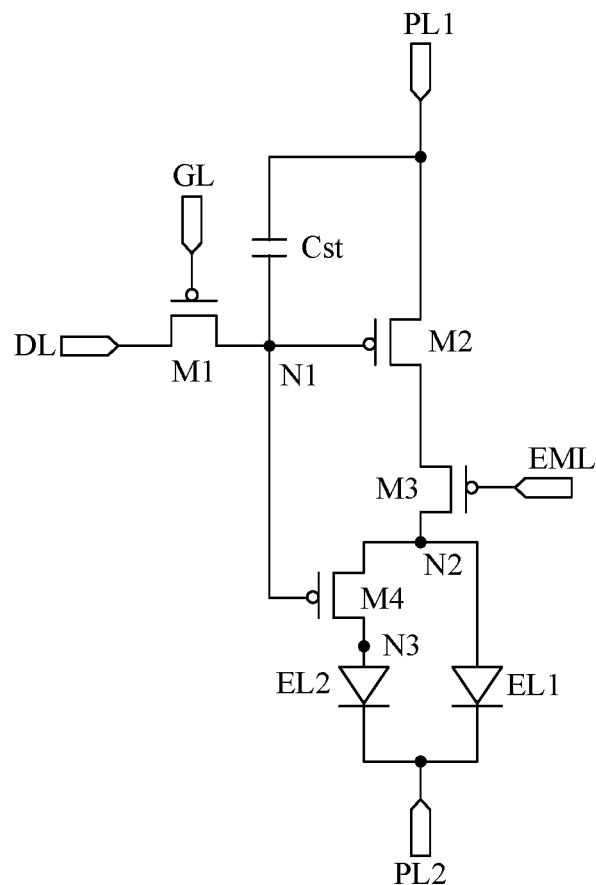
FIG. 6 is an equivalent circuit diagram of a pixel circuit according to at least one embodiment of the present disclosure.

FIG. 6 is an equivalent circuit diagram of a pixel circuit according to at least one embodiment of the present disclosure. In some exemplary embodiments, as shown in FIG. 6, in the pixel circuit of the present exemplary embodiment, an input circuit includes a data writing transistor M1 and a storage capacitor Cst; a first light emitting control circuit includes a driving transistor M2 and a first light emitting control transistor M3; and a second light emitting control circuit includes a second light emitting control transistor M4.

In some exemplary embodiments, as shown in FIG. 6, a control electrode of the data writing transistor M1 is coupled with a scanning signal line GL, a first electrode of the data writing transistor M1 is coupled with a data signal line DL, and a second electrode of the data writing transistor M1 is coupled with a first node N1. A first terminal of the storage capacitor Cst is coupled with a first power supply line PL1, and a second terminal of the storage capacitor Cst is coupled with the first node N1. A control electrode of the driving transistor M2 is coupled with the first node N1, a first electrode of the driving transistor M2 is coupled with the first power supply line PL1, and a second electrode of the driving transistor M2 is coupled with a first electrode of a first light emitting control transistor M3. A control electrode of the first light emitting control transistor M3 is coupled with a light emitting control signal line EML, and a second electrode of the first light emitting control transistor M3 is coupled with a second node N2. A control electrode of a second light emitting control transistor M4 is coupled with the first node N1, a first electrode of the second light emitting control transistor M4 is coupled with the second node N2, and a second electrode of the second light emitting control transistor M4 is coupled with a third node N3. A first electrode of a first light emitting unit EL1 is coupled with the second node N2, and a second electrode of the first light emitting unit EL1 is coupled with a second power supply line PL2. A first electrode of the second light emitting unit EL2 is coupled with the third node N3, and a second electrode of the second light emitting unit EL2 is coupled with the second power supply line PL2.

Solutions of the embodiment are further described below through an operation process of the pixel circuit provided in FIG. 6.

The data writing transistor M1, the driving transistor M2, the first light emitting control transistor M3, and the second light emitting control transistor M4 in the pixel circuit provided in FIG. 6 all being P-type thin film transistors is taken as an example for description. Herein, a P-type transistor is conducted when a control electrode is at a low level, and cut-off when the control electrode is at a high level. In some examples, a plurality of transistors in the present embodiment may alternatively be N-type transistors. Herein, an N-type transistor is conducted when a control electrode is at a high level, and cut-off when the control electrode is at a low level. Using a same type of transistors in a pixel circuit may simplify a process flow, reduce a process difficulty of a display substrate, and improve a yield of products. However, the embodiment of the present disclosure is not limited to this. In some examples, a part of the plurality of transistors in the present embodiment is P-type transistors, and another part of the plurality of transistors are N-type transistors.

In some exemplary embodiments, the data writing transistor M1, the driving transistor M2, the first light emitting control transistor M3, and the second light emitting control transistor M4 in the pixel circuit may use low temperature poly-silicon thin film transistors, or may use oxide thin film transistors, or may use both the low temperature poly-silicon thin film transistors and the oxide thin film transistors. The active layer of the low temperature poly-silicon thin film transistor is made of Low Temperature Poly-Silicon (LTPS), and the active layer of the oxide thin film transistor is made of an oxide (Oxide). The low temperature poly-silicon thin film transistor has advantages of a high mobility, fast charging, and the like, and the oxide thin film transistor has advantages of a low leakage current and the like. In some exemplary embodiments, the low temperature poly-silicon thin film transistors and the oxide thin film transistors may be integrated on one display substrate to form a Low Temperature Polycrystalline Oxide (LTPO) display substrate. Advantages of the low temperature poly-silicon thin film transistor and the oxide thin film transistor may be used to achieve high Pixel Per Inch (PPI) and low frequency driving, so that power consumption may be reduced, and display quality may be improved.

Figure 7:
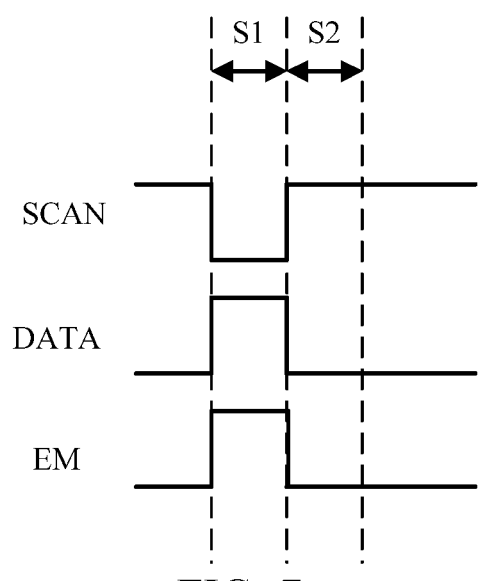
FIG. 7 is an operating timing diagram of the pixel circuit provided in FIG. 6.

FIG. 7 is a working timing diagram of the pixel circuit provided in FIG. 6. As shown in FIG. 6, the pixel circuit involved in the present embodiment includes: four transistors (i.e., the data writing transistor M1, the driving transistor M2, the first light emitting control transistor M3, and the second light emitting control transistor M4), one capacitor unit (i.e., the storage capacitor Cst), three signal input terminals (i.e., the scanning signal line GL, the data signal line DL, and the light emitting control signal line EML), and two power supply terminals (i.e., the first power supply line PL1 and the second power supply line PL2). Herein, the first power supply line PL1 continuously provides a high level signal, such as a first power supply signal VDD; and the second power supply line PL2 continuously provides a low level signal, such as a second power supply signal VSS.

Within a period of one frame, the pixel circuit may include the following working states: a data writing stage and a light emitting stage.

In a first stage S1, that is, the data writing stage, as shown in FIG. 7, a scanning signal SCAN provided by the scanning signal line GL is at a low level, the data writing transistor M1 is conducted, a light emitting control signal EM provided by the light emitting control signal line EML is at a high level, and the first light emitting control transistor M3 is disconnected. The data writing transistor M1 is conducted and the storage capacitor Cst is charged to store a data signal DATA provided by the data signal line DL in the storage capacitor Cst. The data signal DATA stored by the storage capacitor Cst may control a conduction degree of the driving transistor M2.

In a second stage S2, that is, the light emitting stage, as shown in FIG. 7, a scanning signal SCAN provided by the scanning signal line GL is at a high level, the data writing transistor M1 is disconnected, a light emitting control signal EM provided by the light emitting control signal line EML is at a low level, and the first light emitting control transistor M3 is conducted. When a voltage of the first node N1 conducts both the driving transistor M2 and the second light emitting control transistor M4, a driving current provided by the driving transistor M2 flows into the first light emitting unit EL1 through the first light emitting control transistor M3 to cause the first light emitting unit EL1 to emit light, and meanwhile flows into the second light emitting unit EL2 through the first light emitting control transistor M3 and the second light emitting control transistor M4 to cause the second light emitting unit EL2 to emit light. When a voltage of the first node N1 only conducts the driving transistor M2, a driving current provided by the driving transistor M2 flows into the first light emitting unit EL1 through the first light emitting control transistor M3 to cause the first light emitting unit EL1 to emit light; the second light emitting control transistor M4 is disconnected, and the second light emitting unit EL2 is turned off.

In the present example, threshold voltages of the driving transistor M2 and the second light emitting control transistor M4 are the same. A turn-on voltage of the driving transistor M2 depends on ($V_{N1}$–VDD), and a turn-on voltage of the second light emitting control transistor M4 depends on [$V_{N1}$–(VDD–$Vth_{(M2)}$–$Vth_{(M3)}$)]. Herein, $V_{N1}$ denotes a voltage of the first node N1, VDD is a first power supply signal provided by the first power supply line PL1, $Vth_{(M2)}$ is a threshold voltage of the driving transistor M2, and $Vth_{(M3)}$ is a threshold voltage of the first light emitting control transistor M3.

In some examples, when $V_{N1}$–VDD>0V, the driving transistor M2 is disconnected, and when $V_{N1}$–VDD<0V, the driving transistor M2 is conducted. When ($V_{N1}$–VDD) is positive, the driving transistor M2 is completely turned off; and when ($V_{N1}$–VDD) is negative and an absolute value is larger, a driving current provided by the driving transistor M2 is larger, so that a brightness of a sub-pixel is higher.

In some examples, a threshold voltage Vth is about 0.2 V to 0.3 V. Because [$V_{N1}$–(VDD–$Vth_{(M2)}$–$Vth_{(M3)}$)] is greater than ($V_{N1}$–VDD), the driving transistor M2 will be conducted when the second light emitting control transistor M4 is disconnected. For example, in the light emitting stage S2, when a voltage of the first node N1 is greater than (VDD–$Vth_{(M2)}$–$Vth_{(M3)}$) and less than VDD, the second light emitting control transistor M4 is disconnected, and the driving transistor M2 is conducted, then the first light emitting unit EL1 continues to emit light, while the second light emitting unit EL2 is turned off, and stops emitting light. After the second light emitting unit EL2 is turned off, a luminous area of the sub-pixel is reduced to a luminous area of the first light emitting unit EL1, and a driving current of the first light emitting unit EL1 is improved, thereby improving a brightness of the first light emitting unit EL1.

In the present exemplary embodiment, a single luminous region of the sub-pixel is divided into two luminous regions (corresponding to a region in which the first light emitting unit is located and a region in which the second light emitting unit is located), and the two luminous regions are driven by different voltages, so that luminous areas of the sub-pixel are different under driving of different voltages. In the present embodiment, by turning off the second light emitting unit of the sub-pixel and maintaining light emitting of the first light emitting unit of the sub-pixel, the luminous area of the sub-pixel can be reduced and the driving current of the first light emitting unit can be improved, thereby improving the brightness of the sub-pixel. When a same display gray-scale is implemented, a brightness of partial luminous area of the sub-pixel is greater than a brightness of the whole luminous area of the sub-pixel, which is beneficial to weaken a brightness difference between sub-pixels under a low gray-scale, so as to improve the display effect under the low gray-scale.

In some exemplary embodiments, a brightness of the display gray-scale is obtained according to a set requirement, a set data voltage is obtained by gamma debugging, and a required driving current is obtained by the pixel circuit. Taking a red (R) sub-pixel as an example, when a driving voltage of the red sub-pixel is about 6.3 V, the red sub-pixel correspondingly displays 1 gray-scale. Taking a red sub-pixel including the first light emitting unit and the second light emitting unit, and a threshold voltage of a transistor being about 0.3 V as an example, the second light emitting unit is turned off when a driving voltage is about 5.7 V, at which time the red sub-pixel may display 11 gray-scales. By turning off the second light emitting unit, reducing the luminous area of the sub-pixel, and improving the driving current of the first light emitting unit, a brightness of the sub-pixel is improved and the display effect under the low gray-scale is improved.

At least one embodiment of the present disclosure further provides a driving method for a pixel circuit, which is used for driving the pixel circuit as described above. The driving method of the present embodiment includes: when a gray-scale of a first range is displayed, an input circuit writes a data signal provided by a data signal line to a first node and stores the data signal written to the first node, under controlling of a scanning signal provided by a scanning signal line; a first light emitting control circuit provides a driving current to a second node, under controlling of a first power supply signal provided by a first power supply line, the first node, and a light emitting control signal provided by a light emitting control signal line, and a second light emitting control circuit provides a driving current to a third node, under controlling of a control terminal. When a gray-scale of a second range is displayed, the input circuit writes a data signal provided by the data signal line to the first node and stores the data signal written to the first node, under controlling of a scanning signal provided by the scanning signal line; the first light emitting control circuit provides a driving current to the second node, under controlling of a first power supply signal provided by the first power supply line, the first node, and a light emitting control signal provided by the light emitting control signal line; and the second light emitting control circuit disconnects the second node and the third node, under controlling of the control terminal. Herein, gray-scales of the first range are larger than gray-scales of the second range. In the present example, when a gray-scale of the first range is displayed, a first light emitting unit and a second light emitting unit both emit light, and when a gray-scale of the second range is displayed, the first light emitting unit emits light and the second light emitting unit does not emit light.

In some examples, the first range is a high gray-scale range, and the second range is a low gray-scale range. For example, the first range may be greater than 32 gray-scales, and the second range may be less than or equal to 32 gray-scales. However, this embodiment is not limited thereto.

A method for controlling a pixel circuit according to the present embodiment is used in the pixel circuit according to the aforementioned embodiments, and an implementation principle and an effect thereof are similar and thus will not be repeated here.

At least one embodiment of the present disclosure further provides a display substrate, including a plurality of sub-pixels disposed on a substrate. At least one sub-pixel includes the pixel circuit as described in the preceding embodiments, and a first light emitting unit and a second light emitting unit coupled with the pixel circuit. A structure of the pixel circuit may be referred to the descriptions of the aforementioned embodiments and thus are not repeated here.

In some exemplary embodiments, the first light emitting unit includes: a first anode, a first cathode, and a first organic light emitting layer disposed between the first anode and the first cathode. The second light emitting unit includes: a second anode, a second cathode, and a second organic light emitting layer disposed between the second anode and the second cathode. The first anode and the second anode are isolated from each other, and the first anode and the second anode are coupled with the pixel circuit. The first organic light emitting layer and the second organic light emitting layer are isolated from each other, and the first cathode and the second cathode are of an integrated structure. In the present exemplary embodiment, the first light emitting unit and the second light emitting unit of a sub-pixel are driven with different voltages using the pixel circuit.

In some exemplary embodiments, the first light emitting unit is located on one side of the second light emitting unit. For example, a luminous region of the sub-pixel is divided into symmetrical first light emitting unit and second light emitting unit. For example, a ratio of luminous areas of the first light emitting unit to the second light emitting unit may be about 1:1. However, this embodiment is not limited thereto.

In some exemplary embodiments, the first light emitting unit surrounds a periphery of the second light emitting unit. For example, a luminous region of the sub-pixel is divided according to a center and periphery surrounding manner. For example, a ratio of luminous areas of the first light emitting unit to the second light emitting unit may be about 2:1. However, this embodiment is not limited thereto.

In some exemplary embodiments, the first light emitting unit surrounds a periphery of the second light emitting unit. The first light emitting unit includes a first light emitting portion and a second light emitting portion, and the second light emitting unit is located between the first light emitting portion and the second light emitting portion. The first light emitting portion and the second light emitting portion may be coupled and coupled with the pixel circuit.

In some exemplary embodiments, at least one sub-pixel at least includes a green sub-pixel. For example, only luminous regions of green sub-pixels on the display substrate may be partitioned, or luminous regions of both green sub-pixels and red sub-pixels (or blue sub-pixels) on the display substrate may be partitioned, or luminous regions of all sub-pixels on the display substrate may be partitioned. However, this embodiment is not limited thereto.

A structure of the display substrate of the present embodiment will be illustrated through some examples below.

Figure 8:
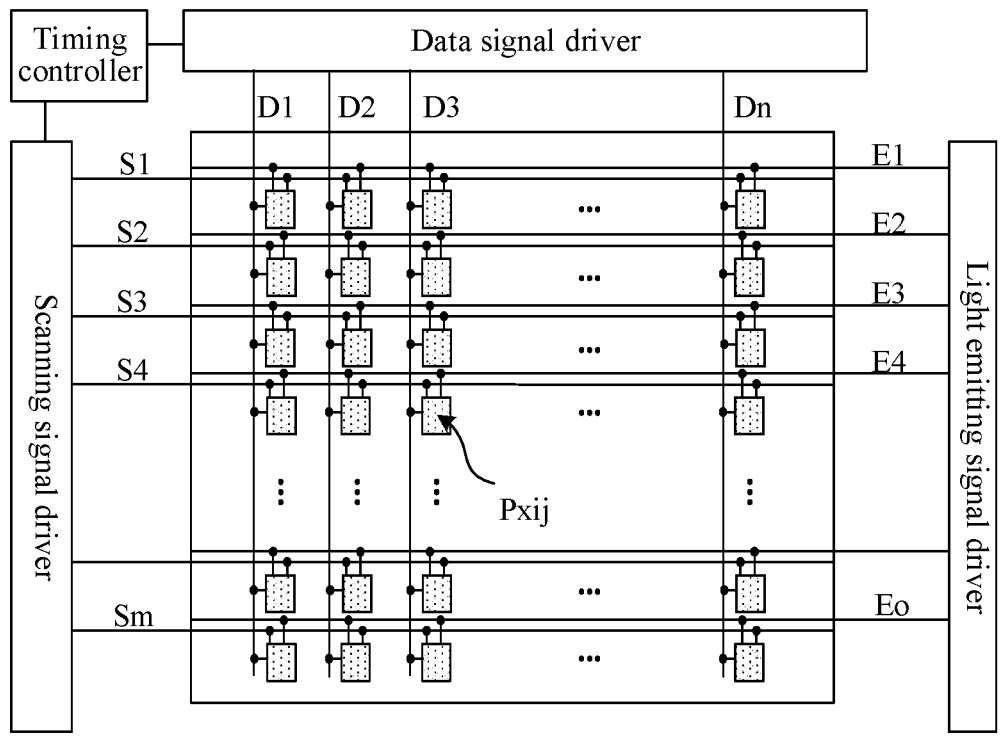
FIG. 8 is a schematic diagram of a structure of a display substrate according to at least one embodiment of the present disclosure.

FIG. 8 is a schematic diagram of a structure of a display substrate according to at least one embodiment of the present disclosure. In some exemplary embodiments, as shown in FIG. 8, the display substrate may include a pixel array. The pixel array is connected with a data signal driver, a scanning signal driver, and a light emitting signal driver, and the data signal driver, the scanning signal driver, and the light emitting signal driver are connected with a timing controller. The pixel array may include a plurality of scanning signal lines (for example, S1 to Sm), a plurality of data signal lines (for example, D1 to Dn), a plurality of light emitting control signal lines (for example, E1 to Eo), and a plurality of sub-pixels Pxij. In some examples, the timing controller may provide a gray-scale value and a control signal suitable for a specification of the data signal driver to the data signal driver, provide a clock signal, a scanning starting signal, or the like, suitable for a specification of the scanning signal driver to the scanning signal driver, and provide a clock signal, an emission stopping signal, or the like, suitable for a specification of the light emitting signal driver to the light emitting signal driver. The data signal driver may generate a data signal to be provided to the data signal lines D1, D2, D3, . . . , and Dn by using the gray-scale value and the control signal which are received from the timing controller. For example, the data signal driver may sample the gray-scale value using a clock signal and apply a data voltage corresponding to the gray-scale value to the data signal lines D1 to Dn by taking a pixel row as a unit, wherein n may be a natural number. The scanning signal driver may generate a scanning signal to be provided to the scanning signal lines S1, S2, S3, . . . , and Sm by receiving the clock signal, the scanning starting signal, or the like, from the timing controller. For example, the scanning signal driver may sequentially provide a scanning signal with an on-level pulse to the scanning signal lines S1 to Sm. For example, the scanning signal driver may be constructed in a form of a shift register, and may generate a scanning signal in a manner of sequentially transmitting a scanning starting signal provided in a form of an on-level pulse to a next-stage circuit under controlling of the clock signal, wherein m may be a natural number. The light emitting signal driver may generate an emission signal to be provided to the light emitting control signal lines E1, E2, E3 . . . , and Eo by receiving the clock signal, the emission stopping signal, or the like, from the timing controller. For example, the light emitting signal driver may sequentially provide an emission signal with an off-level pulse to the light emitting control signal lines E1 to Eo. For example, the light emitting signal driver may be constructed in a form of a shift register and generate a light emitting signal in a manner of sequentially transmitting a light emitting stopping signal provided in a form of an off-level pulse to a next-stage circuit under control of a clock signal, wherein o may be a natural number. The pixel array may include a plurality of sub-pixels Pxij. Each sub-pixel Pxij may be connected to the corresponding data signal line, the corresponding scanning signal line, and the corresponding light emitting control signal line, wherein, i and j may be natural numbers. The sub-pixel Pxij may refer to a sub-pixel with a transistor therein being connected to the i-th scanning signal line and connected with the j-th data signal line.

Figure 9:
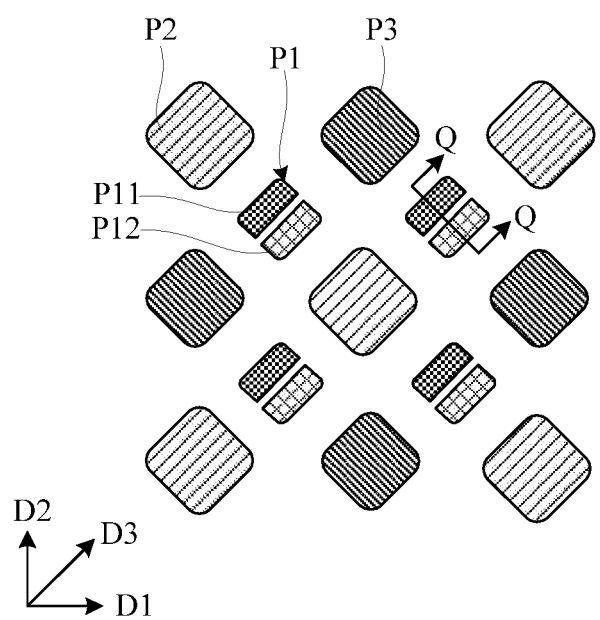
FIG. 9 is a schematic diagram of a partial plan structure of a display substrate according to at least one embodiment of the present disclosure.

FIG. 9 is a schematic diagram of a partial plan structure of a display substrate according to at least one embodiment of the present disclosure. In some exemplary embodiments, as shown in FIG. 9, the display substrate may include: a first sub-pixel P1 which emits light of a first color, a second sub-pixel P2 which emits light of a second color, and a third sub-pixel P3 which emits light of a third color. In some examples, the first sub-pixel P1 may include a first pixel circuit, a first light emitting unit P11, and a second light emitting unit P12, the second sub-pixel P2 may include a second pixel circuit and a second light emitting element, and the third sub-pixel P3 may include a third pixel circuit and a third light emitting element. In some examples, the first pixel circuit may be the pixel circuit as shown in FIG. 6, outputting drive currents to the first light emitting unit P11 and the second light emitting unit P12. The second pixel circuit may be a pixel circuit in a 3T1C structure, be coupled with a scanning signal line, a data signal line, and a light emitting control signal line respectively, and be configured to receive a data signal transmitted by the data signal line and output a corresponding driving current to the second light emitting element, under controlling of the scanning signal line and the light emitting control signal line. The second light emitting element is configured to emit light of a corresponding brightness in response to a driving current outputted by the second pixel circuit. The third pixel circuit may be a pixel circuit in a 3T1C structure, and output a corresponding driving current to the third light emitting element, and the third light emitting element is configured to emit light of a corresponding brightness in response to a driving current outputted by the third pixel circuit. However, this embodiment is not limited thereto. For example, the second pixel circuit and the third pixel circuit may include other numbers of transistors and capacitors.

In some exemplary embodiments, the light of the first color may be green light, the light of the second color may be blue light, and the light of the third color may be red light. Luminous efficiencies of sub-pixels of different colors are different. Herein, a luminous efficiency of a blue sub-pixel is less than a luminous efficiency of a red sub-pixel, and the luminous efficiency of the red sub-pixel is less than a luminous efficiency of a green sub-pixel. Because the green sub-pixel has the highest luminous efficiency and needs a low current, in the present example, only the first sub-pixel P1 (i.e., the green sub-pixel) is partitioned to form two light emitting units (i.e., the first light emitting unit P11 and the second light emitting unit P12) and the two light emitting units are driven by the pixel circuit according to the above embodiment through different voltages to improve the display effect under a low gray-scale. However, this embodiment is not limited thereto.

In some exemplary embodiments, as shown in FIG. 9, one repeating unit in a pixel array includes: two first sub-pixels P1 arranged in a second direction D2, and a second sub-pixel P2 and a third sub-pixel P3 arranged respectively on both sides of the two first sub-pixels P1 in a first direction D1. A first sub-pixel P1 (for example, a green sub-pixel) and a third sub-pixel P3 (for example, a red sub-pixel) in one repeating unit form one pixel unit, and further a second sub-pixel P2 (for example, a blue sub-pixel) in another repeating unit adjacent thereto is borrowed to form one virtual pixel for display. A second sub-pixel P2 (for example, a blue sub-pixel) and another first sub-pixel P1 (for example, a green sub-pixel) in the repeating unit form one pixel, and further a third sub-pixel (for example, a red sub-pixel) in another repeating unit adjacent thereto is borrowed to form one virtual pixel for display. In the second direction D2, second sub-pixels P2 and third sub-pixels P3 are arranged at intervals, and in a third direction D3, the second sub-pixels P2 and first sub-pixels P1 are arranged at intervals. Herein, the first direction D1 is perpendicular to the second direction D2, and the third direction D3 intersects with both the first direction D1 and the second direction D2. However, this embodiment is not limited thereto. For example, one pixel unit includes three sub-pixels (for example, a red sub-pixel, a green sub-pixel, and a blue sub-pixel), wherein the three sub-pixels may be arranged in parallel in a horizontal direction, or in parallel in a vertical direction; and one pixel unit includes four sub-pixels (for example, a red sub-pixel, a green sub-pixel, a blue sub-pixel, and a white sub-pixel), wherein the four sub-pixels may be arranged in parallel in a horizontal direction, in parallel in a vertical direction, or in a square.

In some examples, shapes of the second sub-pixel P2 and the third sub-pixel P3 may be rectangular shapes. The first light emitting unit P11 and the second light emitting unit P12 of the first sub-pixel P1 may be of rectangular shapes. However, this embodiment is not limited thereto. For example, the second sub-pixel, the third sub-pixel, the first light emitting unit, and the second light emitting unit may be of other shapes, such as a diamond, a pentagon, or a hexagon.

In some examples, the first light emitting unit P11 and the second light emitting unit P12 of the first sub-pixel P1 are symmetrical with respect to an axis parallel to the third direction D3. A ratio of luminous areas of the first light emitting unit P11 to the second light emitting unit P12 may be about 1:1. In the present example, the luminous areas of the first light emitting unit P11 and the second light emitting unit P12 may refer to areas of luminous regions exposed by openings of a pixel definition layer. However, this embodiment is not limited thereto. In the present example, by controlling the ratio of the luminous areas of the first light emitting unit to the second light emitting unit, multiples of speed of current increase for the first light emitting unit may be adjusted.

Figure 10:
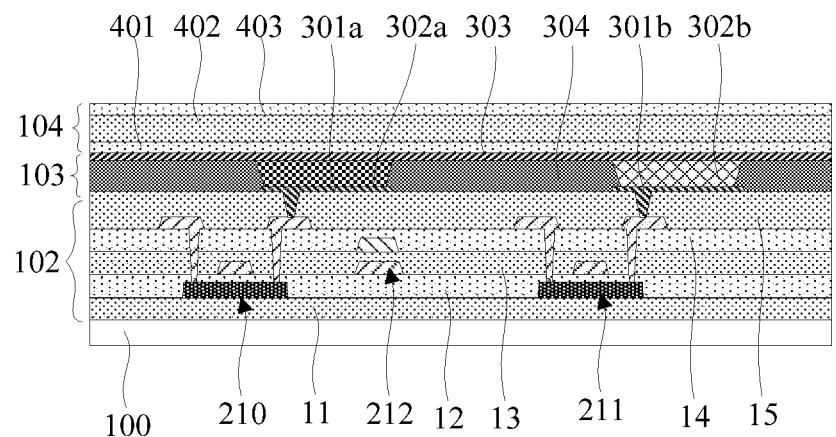
FIG. 10 is a schematic diagram of a partial sectional structure of a display substrate according to at least one embodiment of the present disclosure.

FIG. 10 is a schematic diagram of a partial sectional structure of a display substrate according to at least one embodiment of the present disclosure. FIG. 10 is a partial section schematic diagram along a Q-Q direction in FIG. 9, and only illustrates a partial sectional structure of a first sub-pixel P1 of the display substrate. In some exemplary embodiments, as shown FIG. 10, on a plane perpendicular to the display substrate, the display substrate may include a driving circuit layer 102 disposed on a substrate 100, a light emitting structure layer 103 disposed on one side of the driving circuit layer 102 away from the substrate 100, and an encapsulating layer 104 disposed on one side of the light emitting structure layer 103 away from the substrate 100. In some possible embodiments, the display substrate may include other film layers, such as a Post Spacer, which is not limited in the present disclosure.

In some exemplary embodiments, the substrate 100 may be a flexible substrate or may be a rigid substrate. The driving circuit layer 102 of each sub-pixel may include a plurality of transistors and storage capacitors which form a pixel circuit, and for the driving circuit layer 102 in FIG. 10, only a first transistor 210, a second transistor 211, and one storage capacitor 212 are shown as an example. For example, the first transistor 210 may be the first light emitting control transistor M3 in the pixel circuit shown in FIG. 6, the second transistor 211 may be the second light emitting control transistor M4 in the pixel circuit shown in FIG. 6, and the storage capacitor 212 may be the storage capacitor Cst in the pixel circuit shown in FIG. 6.

In some examples, the light emitting structure layer 103 may at least include: a pixel definition layer 304, a first light emitting unit, and a second light emitting unit. The first light emitting unit includes: a first anode 301a, a first organic light emitting layer 302a, and a cathode 303. The first anode 301a is connected with a drain electrode of the first transistor 210 by a via hole, the first organic light emitting layer 302a is connected with the first anode 301a, the cathode 303 is connected with the first organic light emitting layer 302a, and the first organic light emitting layer 302a emits light of a first color under the drive of the first anode 301a and the cathode 303. The second light emitting unit includes: a second anode 301b, a second organic light emitting layer 302b, and a cathode 303. The second anode 301b is connected with a drain electrode of the second transistor 211 by a via hole, the second organic light emitting layer 302b is connected with the second anode 301b, the cathode 303 is connected with the second organic light emitting layer 302b, and the second organic light emitting layer 302b emits light of the first color under the drive of the second anode 301b and the cathode 303. In the present example, the first light emitting unit and the second light emitting unit both emit green light. Luminous regions of the first light emitting unit and the second light emitting unit are regions corresponding to openings of a pixel definition layer 304. The light emitting structure layer 103 may further include: a second light emitting element of a second sub-pixel P2 and a third light emitting element of a third sub-pixel P3. The second light emitting element may include a first electrode, a second electrode, and an organic light emitting layer disposed between the first electrode and the second electrode, the first electrode of the second light emitting element being coupled with a second pixel circuit; the third light emitting element may include a first electrode, a second electrode, and an organic light emitting layer disposed between the first electrode and the second electrode, the first electrode of the third light emitting element being coupled with a third pixel circuit.

In some examples, the encapsulating layer 104 may include a first encapsulating layer 401, a second encapsulating layer 402, and a third encapsulating layer 403 which are stacked, wherein the first encapsulating layer 401 and the third encapsulating layer 403 may be made of an inorganic material, the second encapsulating layer 402 may be made of an organic material, and the second encapsulating layer 402 is disposed between the first encapsulating layer 401 and the third encapsulating layer 403, which can ensure that external water vapor cannot enter the light emitting structure layer 103.

In some examples, the organic light emitting layer may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL) which are stacked. In some examples, the first organic light emitting layer of the first light emitting unit and the second organic light emitting layer of the second light emitting unit are isolated from each other. However, this embodiment is not limited thereto. For example, in some examples, hole injection layers of all sub-pixels may be connected together to form a common layer, electron injection layers of all the sub-pixels may be connected together to form a common layer, hole transport layers of all the sub-pixels may be connected together to form a common layer, electron transport layers of all the sub-pixels may be connected together to form a common layer, hole block layers of all the sub-pixels may be connected together to form a common layer, emitting layers of adjacent sub-pixels may be overlapped slightly or may be isolated from each other, and electron block layers of adjacent sub-pixels may be overlapped slightly or may be isolated from each other.

In the display substrate according to the present exemplary embodiment, a luminous region of a green sub-pixel is divided into two half regions (i.e., the luminous region corresponding to the first light emitting unit and the luminous region corresponding to the second light emitting unit), and the two half regions of the green sub-pixel are driven by the pixel circuit according to the above embodiment using different voltages, thus a luminous area of the green sub-pixel can be reduced under a low gray-scale, a display brightness can be improved, and the display effect can be improved under the low gray-scale.

The structure (or method) shown in this embodiment may be combined with structures (or methods) shown in other embodiments as appropriate.

Figure 11:
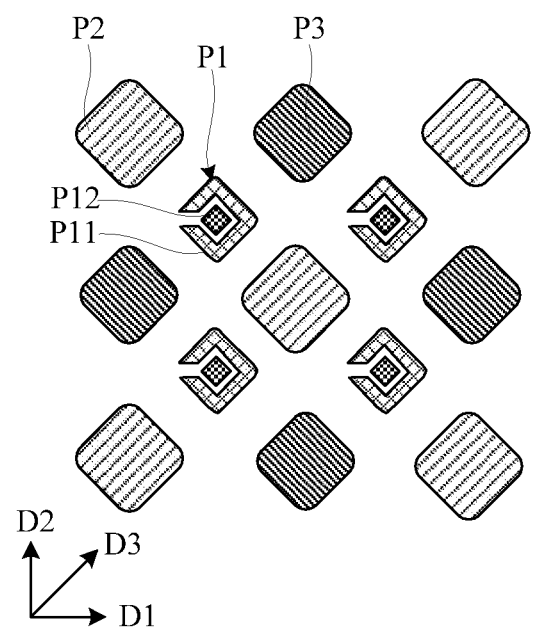
FIG. 11 is another schematic diagram of a partial plan structure of a display substrate according to at least one embodiment of the present disclosure.

FIG. 11 is another partial plan schematic diagram of a display substrate according to at least one embodiment of the present disclosure. In some exemplary embodiments, as shown in FIG. 11, a first sub-pixel P1 emitting light of a first color includes a first pixel circuit, a first light emitting unit P11, and a second light emitting unit P12. The first light emitting unit P11 surrounds a periphery of the second light emitting unit P12. A ratio of luminous areas of the first light emitting unit P11 to the second light emitting unit P12 is about 2:1. For example, the second light emitting unit P12 may be of a rectangular shape, and the first light emitting unit P11 may be of a ring shape with one notch surrounding the second light emitting unit P12. In the present example, by cutting off the first light emitting unit P11, support can be provided for a Fine Metal Mask (FMM), so as to meet a process requirement and facilitate preparation for an organic light emitting layer. However, this embodiment is not limited thereto.

Rest of the structure of the display substrate according to this embodiment may be referred to descriptions of the aforementioned embodiments, and will not be repeated here. The structure (or method) shown in this embodiment may be combined with structures (or methods) shown in other embodiments as appropriate.

Figure 12:
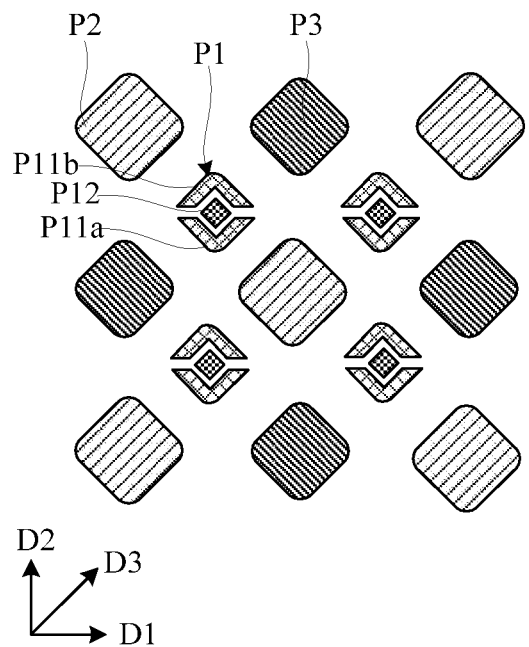
FIG. 12 is another schematic diagram of a partial plan structure of a display substrate according to at least one embodiment of the present disclosure.

FIG. 12 is another partial plan schematic diagram of a display substrate according to at least one embodiment of the present disclosure. In some exemplary embodiments, as shown in FIG. 12, a first sub-pixel P1 emitting light of a first color includes a first pixel circuit, a first light emitting unit P11, and a second light emitting unit P12. The first light emitting unit P11 surrounds a periphery of the second light emitting unit P12. A ratio of luminous areas of the first light emitting unit P11 to the second light emitting unit P12 is about 2:1. For example, the second light emitting unit P12 may be of a rectangular shape. The first light emitting unit P11 has a first light emitting portion P11a and a second light emitting portion P11b connected to each other. For example, organic light emitting layers of the first light emitting portion P11a and the second light emitting portion P11b may be communicated. The first light emitting portion P11a and the second light emitting portion P11b may be symmetrical with respect to an axis parallel to a first direction D1. However, this embodiment is not limited thereto. In the present exemplary embodiment, by dividing the first light emitting unit into two symmetrical portions, which can improve uniformity of a display brightness of the first sub-pixel when the second light emitting unit is turned off.

Rest of the structure of the display substrate according to this embodiment may be referred to descriptions of the aforementioned embodiments, and will not be repeated here. The structure (or method) shown in this embodiment may be combined with structures (or methods) shown in other embodiments as appropriate.

Figure 13:
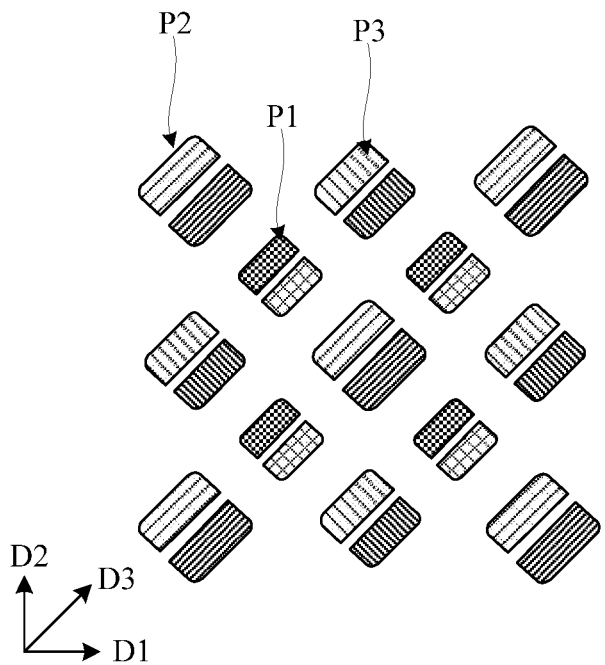
FIG. 13 is another schematic diagram of a partial plan structure of a display substrate according to at least one embodiment of the present disclosure.

FIG. 13 is another partial plan schematic diagram of a display substrate according to at least one embodiment of the present disclosure. In some exemplary embodiments, as shown in FIG. 13, a first sub-pixel P1 emitting light of a first color, a second sub-pixel P2 emitting light of a second color, and a third sub-pixel P3 emitting light of a third color each include a pixel circuit, and a first light emitting unit and a second light emitting unit connected with the pixel circuit. A structure of the pixel circuit may be referred to the description of the pixel circuit according to the aforementioned embodiments, and descriptions of the first light emitting unit and the second light emitting unit may be referred to the related description shown in FIG. 9, so they will not be repeated here. The structure (or method) shown in this embodiment may be combined with structures (or methods) shown in other embodiments as appropriate.

Figure 14:
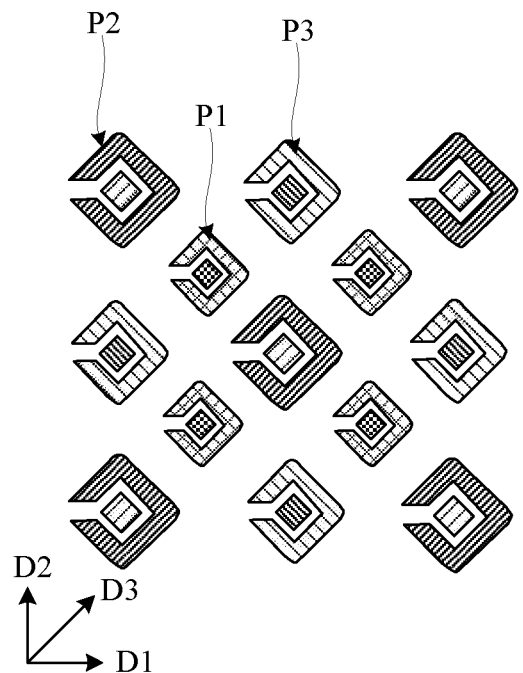
FIG. 14 is another schematic diagram of a partial plan structure of a display substrate according to at least one embodiment of the present disclosure.

FIG. 14 is another partial plan schematic diagram of a display substrate according to at least one embodiment of the present disclosure. In some exemplary embodiments, as shown in FIG. 14, a first sub-pixel P1 emitting light of a first color, a second sub-pixel P2 emitting light of a second color, and a third sub-pixel P3 emitting light of a third color each include a pixel circuit, and a first light emitting unit and a second light emitting unit connected with the pixel circuit. A structure of the pixel circuit may be referred to the description of the pixel circuit according to the aforementioned embodiments, and descriptions of the first light emitting unit and the second light emitting unit may be referred to the related description shown in FIG. 11, so they will not be repeated here. The structure (or method) shown in this embodiment may be combined with structures (or methods) shown in other embodiments as appropriate.

Figure 15:
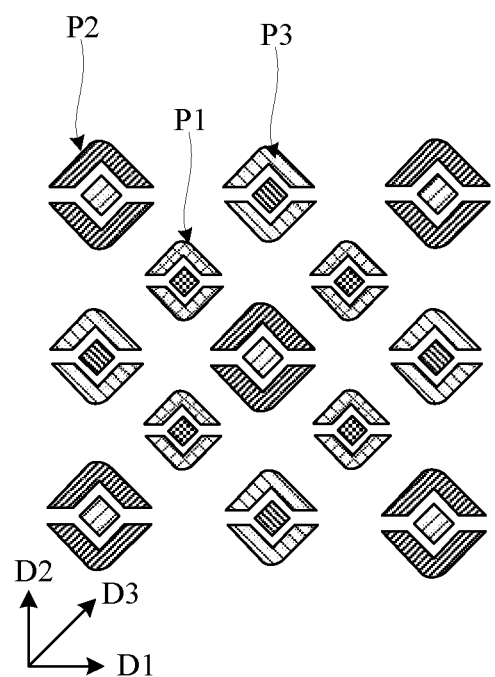
FIG. 15 is another schematic diagram of a partial plan structure of a display substrate according to at least one embodiment of the present disclosure.

FIG. 15 is another partial plan schematic diagram of a display substrate according to at least one embodiment of the present disclosure. In some exemplary embodiments, as shown in FIG. 15, a first sub-pixel P1 emitting light of a first color, a second sub-pixel P2 emitting light of a second color, and a third sub-pixel P3 emitting light of a third color each include a pixel circuit, and a first light emitting unit and a second light emitting unit connected with the pixel circuit. A structure of the pixel circuit may be referred to the description of the pixel circuit according to the aforementioned embodiments, and descriptions of the first light emitting unit and the second light emitting unit may be referred to the related description shown in FIG. 12, so they will not be repeated here. The structure (or method) shown in this embodiment may be combined with structures (or methods) shown in other embodiments as appropriate.

In the display substrate shown in FIGS. 13 to 15, each sub-pixel is divided into two light emitting units and driven by different voltages provided by the pixel circuit to reduce a luminous area of the sub-pixel under a low gray-scale, thereby increasing a display brightness of the sub-pixel and improving the display effect under the low gray-scale.

Figure 16:
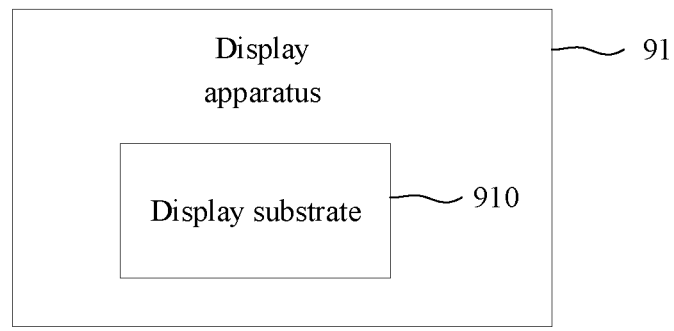
FIG. 16 is a schematic diagram of a display device according to at least one embodiment of the present disclosure.

FIG. 16 is a schematic diagram of a display device according to at least one embodiment of the present disclosure. As shown in FIG. 16, a display device 91 is provided in this embodiment, which includes a display substrate 910 in the aforementioned embodiments. In some examples, the display substrate 910 may be an OLED display substrate, a QLED display substrate, a Micro-LED display substrate, or a Mini-LED display substrate. The display device 91 may be any product or component with a display function, such as a mobile phone, a tablet computer, a television, a display, a notebook computer, a digital photo frame, and a navigator. However, this embodiment is not limited thereto.

The drawings of the present disclosure only involve structures involved in the present disclosure, and other structures may refer to conventional designs. The embodiments in the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. A pixel circuit, configured to drive a first light emitting unit and a second light emitting unit of a sub-pixel to emit light, the pixel circuit comprising: an input circuit, a first light emitting control circuit, and a second light emitting control circuit, wherein:

the input circuit is respectively coupled with a data signal line, a scanning signal line, a first power supply line, and a first node, and is configured to write a data signal provided by the data signal line to the first node and store the data signal written into the first node, under controlling of a scanning signal provided by the scanning signal line;

the first light emitting control circuit is respectively coupled with the first power supply line, a light emitting control signal line, the first node, and a second node, and is configured to provide a driving current to the second node, under controlling of a first power supply signal provided by the first power supply line, the first node, and a light emitting control signal provided by the light emitting control signal line; the second node is coupled with a first electrode of the first light emitting unit;

the second light emitting control circuit is respectively coupled with a control terminal, the second node, and a third node, and is configured to conduct the second node and the third node, under controlling of the control terminal; the third node is coupled with a first electrode of the second light emitting unit; and a second electrode of the first light emitting unit and a second electrode of the second light emitting unit are both coupled with a second power supply line;

wherein a single luminous region of the sub-pixel is divided into two luminous regions comprising a region in which the first light emitting unit is located and a region in which the second light emitting unit is located;

the first light emitting unit of the sub-pixel is controlled to emit light by the first light emitting control circuit, and the second light emitting unit of the sub-pixel is controlled to emit light by the first light emitting control circuit and the second light emitting control circuit;

wherein the control terminal is coupled with the first node;

wherein the second light emitting control circuit comprises: a second light emitting control transistor; a control electrode of the second light emitting control transistor is coupled with the first node, a first electrode of the second light emitting control transistor is coupled with the second node, and a second electrode of the second light emitting control transistor is coupled with the third node.

2. The pixel circuit of claim 1, wherein the input circuit comprises: a data writing transistor and a storage capacitor; a control electrode of the data writing transistor is coupled with the scanning signal line, a first electrode of the data writing transistor is coupled with the data signal line, and a second electrode of the data writing transistor is coupled with the first node; and a first terminal of the storage capacitor is coupled with the first power supply line, and a second terminal of the storage capacitor is coupled with the first node.

3. The pixel circuit of claim 1, wherein the first light emitting control circuit comprises: a driving transistor and a first light emitting control transistor; a control electrode of the driving transistor is coupled with the first node, a first electrode of the driving transistor is coupled with the first power supply line, and a second electrode of the driving transistor is coupled with a first electrode of the first light emitting control transistor; a control electrode of the first light emitting control transistor is coupled with the light emitting control signal line, and a second electrode of the first light emitting control transistor is coupled with the second node.

4. The pixel circuit of claim 1, wherein the input circuit comprises: a data writing transistor and a storage capacitor; the first light emitting control circuit comprises a driving transistor and a first light emitting control transistor;
   a control electrode of the data writing transistor is coupled with the scanning signal line, a first electrode of the data writing transistor is coupled with the data signal line, and a second electrode of the data writing transistor is coupled with the first node;
   a first terminal of the storage capacitor is coupled with the first power supply line, and a second terminal of the storage capacitor is coupled with the first node;
   a control electrode of the driving transistor is coupled with the first node, a first electrode of the driving transistor is coupled with the first power supply line, and a second electrode of the driving transistor is coupled with a first electrode of the first light emitting control transistor;
   a control electrode of the first light emitting control transistor is coupled with the light emitting control signal line, and a second electrode of the first light emitting control transistor is coupled with the second node.

5. A driving method for a pixel circuit, used for driving the pixel circuit of claim 1, wherein the driving method comprises:
   in a case of displaying gray-scales of a first range, writing, by the input circuit, the data signal provided by the data signal line to the first node and storing the data signal written to the first node, under controlling of the scanning signal provided by the scanning signal line; providing, by the first light emitting control circuit, the driving current to the second node, under controlling of the first power supply signal provided by the first power supply line, the first node, and the light emitting control signal provided by the light emitting control signal line, and providing, by the second light emitting control circuit, the driving current to the third node, under controlling of the control terminal; and
   in a case of displaying gray-scales of a second range, writing, by the input circuit, the data signal provided by the data signal line to the first node and storing the data signal written to the first node, under controlling of the scanning signal provided by the scanning signal line; providing, by the first light emitting control circuit, the driving current to the second node, under controlling of the first power supply signal provided by the first power supply line, the first node, and the light emitting control signal provided by the light emitting control signal line, and disconnecting, by the second light emitting control circuit, the second node and the third node, under controlling of the control terminal,
   wherein the gray-scales of the first range is larger than the gray-scales of the second range.

6. A display substrate, comprising: a plurality of sub-pixels disposed on a substrate; at least one sub-pixel comprises the pixel circuit of claim 1, and the first light emitting unit and the second light emitting unit coupled with the pixel circuit.

7. The display substrate of claim 6, wherein the first light emitting unit comprises: a first anode, a first cathode, and a first organic light emitting layer disposed between the first anode and the first cathode;
   the second light emitting unit comprises: a second anode, a second cathode, and a second organic light emitting layer disposed between the second anode and the second cathode;
   the first anode and the second anode are isolated from each other, and the first anode and the second anode are coupled with the pixel circuit; the first organic light emitting layer and the second organic light emitting layer are isolated from each other, and the first cathode and the second cathode are of an integrated structure.

8. The display substrate of claim 6, wherein the first light emitting unit is located on a side of the second light emitting unit.

9. The display substrate of claim 6, wherein the first light emitting unit surrounds a periphery of the second light emitting unit.

10. The display substrate of claim 9, wherein the first light emitting unit comprises a first light emitting portion and a second light emitting portion, and the second light emitting unit is located between the first light emitting portion and the second light emitting portion.

11. The display substrate of claim 6, wherein the at least one sub-pixel at least comprises a green sub-pixel.

12. A display apparatus, comprising the display substrate of claim 6.

13. The display substrate of claim 7, wherein the at least one sub-pixel at least comprises a green sub-pixel.

14. The display substrate of claim 8, wherein the at least one sub-pixel at least comprises a green sub-pixel.

15. The display substrate of claim 9, wherein the at least one sub-pixel at least comprises a green sub-pixel.

* * * * *